United States Patent
Cheo et al.

(10) Patent No.: US 7,433,104 B2
(45) Date of Patent: Oct. 7, 2008

(54) METHOD AND APPARATUS FOR ADAPTIVELY ENHANCING COLORS IN COLOR IMAGES

(75) Inventors: Won-hee Cheo, Gyeongju (KR); Chang-yeong Kim, Yongin (KR); Du-sik Park, Suwon (KR); Seong-deok Lee, Yongin (KR); Ho-young Lee, Suwon (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 1004 days.

(21) Appl. No.: 10/621,306

(22) Filed: Jul. 18, 2003

(65) Prior Publication Data

US 2004/0013298 A1   Jan. 22, 2004

(30) Foreign Application Priority Data

Jul. 20, 2002   (KR) ................... 2002-42762
Jun. 24, 2003   (KR) ................ 10-2003-0041060

(51) Int. Cl.
G03F 3/08   (2006.01)

(52) U.S. Cl. .............. 358/520; 358/1.9; 358/518; 382/167

(58) Field of Classification Search ........... 358/1.9, 358/520, 518; 382/167
See application file for complete search history.

(56) References Cited

U.S. PATENT DOCUMENTS

| 4,805,016 | A | * | 2/1989 | Kato ................... 348/71 |
| 5,315,694 | A | | 5/1994 | Kasano |
| 5,450,217 | A | | 9/1995 | Eschbach et al. |
| 6,188,788 | B1 | | 2/2001 | Renner et al. |
| 7,006,251 | B2 | * | 2/2006 | Fujino .............. 358/1.9 |
| 2003/0161530 | A1 | * | 8/2003 | Yamada et al. ........ 382/167 |

FOREIGN PATENT DOCUMENTS

| EP | 0 989 739 A2 | 3/2000 |
| EP | 1 215 886 A2 | 6/2002 |
| EP | 0 989 739 A3 | 9/2002 |
| EP | 1 326 425 A2 | 7/2003 |

(Continued)

OTHER PUBLICATIONS

European Patent Office Search Report.

(Continued)

*Primary Examiner*—Twyler L. Haskins
*Assistant Examiner*—Michael Burleson
(74) *Attorney, Agent, or Firm*—Buchanan Ingersoll & Rooney PC (57) ABSTRACT

A method and an apparatus for adaptively enhancing a color of an image are provided. The apparatus includes a saturation component deriving unit, a saturation enhancement function determining variable calculator, a saturation enhancement unit, and a saturation component synthesizing unit. The saturation component deriving unit derives a saturation component from an input image. The saturation enhancement function determining variable calculator determines a saturation enhancement function used to enhance the saturation of the input image based upon a predetermined reference value. The saturation enhancement unit changes the derived saturation component using the saturation enhancement function. The saturation component synthesizing unit synthesizes the changed saturation component and other components of the input image and generates an output image based upon the synthesized components.

38 Claims, 8 Drawing Sheets

FOREIGN PATENT DOCUMENTS

| | | |
|---|---|---|
| JP | 5-81418 | 4/1993 |
| JP | 11-285019 | 10/1999 |
| JP | 2000-99717 A | 4/2000 |
| JP | 2000-123163 A | 4/2000 |
| JP | 2001-177731 | 6/2001 |
| JP | 2001-218078 | 8/2001 |
| JP | 2003-316343 | 11/2003 |

OTHER PUBLICATIONS

Korean Patent Office Action & English Translation.

Japanese Office Action dated on Jul. 13, 2005.

First Office Action issued by The Patent Office of the People's Republic of China on Nov. 4, 2005 for Chinese Application No. 0317 8485.2 and English translation thereof.

* cited by examiner

METHOD AND APPARATUS FOR ADAPTIVELY ENHANCING COLORS IN COLOR IMAGES

BACKGROUND OF THE INVENTION

This application claims the priority of Korean Patent Application Nos. 2002-42762 and 2003-41060, filed on Jul. 20, 2002 and Jun. 24, 2003, respectively in the Korean Intellectual Property Office, the disclosure of which is incorporated herein by reference.

1. Field of the Invention

The present invention relates to an apparatus and a method for adaptively enhancing the color of an image, and more particularly to an apparatus and a method for enhancing the color of an input image by adaptively changing the saturation of the input image.

2. Description of the Related Art

There have been some conventional techniques of enhancing the color of a color image. One is a method for image-dependent color saturation correction in a natural scene pictorial image disclosed in U.S. Pat. No. 5,450,217 (Xerox Corporation, 1995. 9). In this method, color saturation is enhanced in an HSV color space, which is considered as being capable of representing an image to have almost the same saturation as a recognized saturation of the image. However, this method can enhance the color saturation of certain images only, which have an average saturation of no higher than a certain threshold value. Therefore, in a case where this method is applied to consecutive images constituting a moving image and having a saturation of about the threshold value as average, it may cause flickering on a screen.

Another method is a method of automatically controlling color saturation in a video decoder using recursive algorithm disclosed in U.S. Pat. No. 6,188,788B1 (Texas Instruments Inc., 2001. 2). In this method, a YCbCr signal is obtained from a composite video signal and then compared with an ideal burst signal, thus deriving the ratio of the YCbCr signal to the ideal burst signal. Next, the color of an image is compensated for based upon the YCbCr signal-to-the ideal burst signal ratio by increasing the amplitude gain of a color signal using a recursive algorithm. However, this technique can be limitedly applied to video signals rather than all kinds of color images, and the variation of color difference signals may cause the variation of hues.

Still another method is a method for high-speed color saturation conversion disclosed in U.S. Pat. No. 5,315,694 (Toshiba Kabushiki Kaisha, 1994. 5). This method is based on the assumption that the amount by which the saturation of an RGB color signal of an input image is increased after converting the color signal of the input image into a signal in an HSI (H: hue, S: saturation, and I: intensity) color space is equal to the sum of the RGB vector of the color signal of the input image and the RGB vector obtained by the saturation enhancement in the RGB color space. In other words, the amount by which the saturation of a color signal is increased can be represented with vector in an RGB color space. Accordingly, it is possible to obtain an output RGB signal having an enhanced saturation by converting the amount by which the saturation of an original RGB signal is increased into a 3×3 matrix. According to this technique, a process of non-linearly converting a color space capable of representing an image with hue and saturation into another is unnecessary, and thus this technique is considered as high-speed saturation conversion. However, since this method collectively enhances the saturation of all images by the same amount, it is impossible to adaptively enhance the saturation of color signals in consideration of the characteristics of each input image.

The above-described conventional saturation enhancement techniques collectively rather than adaptively enhance the saturation of color signals of an input image by the same amount without considering the characteristics of portions of the input image, like portions representing a cloud, which are considered as low saturation regions. Accordingly, such low saturation regions of an input image may be represented with unnatural colors.

SUMMARY OF THE INVENTION

The present invention provides a method and an apparatus of adaptively enhancing colors in color images which can be effectively applied to moving images, can prevent a problem of clipping in saturation enhancement, and can prevent the saturation of low saturation images from being excessively enhanced.

According to an aspect of the present invention, there is provided a method for adaptively enhancing a color. The method includes (a) deriving a saturation component from an input image, (b) determining a saturation enhancement function used to enhance the saturation of the input image according to a predetermined reference value, (c) changing the derived saturation component using the saturation enhancement function, (d) generating an output color value by synthesizing the changed saturation component and other components of the input image, and (e) generating an output image based upon the output color value.

Preferably, step (a) includes (a1) converting an input image represented in a first color space into an image in a second color space where the saturation of the input image can be extracted, and (a2) deriving the saturation component from the converted input image.

Preferably, according to the saturation enhancement function, the amounts by which the saturation of an input pixel in a low-saturation region is enhanced and by which the saturation of an input pixel in a high-saturation region is enhanced are different.

Preferably, the saturation enhancement function is determined based on the characteristics of the input image.

Preferably, step (b) includes (b1) extracting an average saturation of the input image from color signals of the input image, (b2) determining a saturation enhancement function determining variable based on the average saturation, and (b3) determining the saturation enhancement function based on the saturation enhancement function determining variable.

Preferably, the saturation enhancement function determining variable is determined using the following equation:

$$a = A(S_{avg}).$$

Here, a and $S_{avg}$ represent the saturation enhancement function determining variable and an average saturation of the input image, respectively.

Preferably, the saturation enhancement function determining variable and the saturation enhancement function are determined using the following equations:

$$a = A(S_{avg})$$

$$S_o = F(S_i) = \frac{(a+1)S_i^2}{a+S_i^2}.$$

Here, F(x), a, $S_{avg}$, $S_i$, and $S_o$ represent the saturation enhancement function, the saturation enhancement function determining variable, an average saturation of the input image, saturation of the input image, and saturation of the output image, respectively.

Preferably, the saturation enhancement function determining variable and the saturation enhancement function are determined using the following equations:

$$a = A(S_{avg})$$
$$S_o = F(S_i) = S_i + a \times \Delta.$$
$$\Delta = \frac{K \times S_i^2}{(K-1) + S_i^2} - S_i$$

Here, F(x), a, $S_{avg}$, $S_i$, $S_o$, and K represent the saturation enhancement function, the saturation enhancement function determining variable, an average saturation of the input image, saturation of the input image, saturation of the output image, and an arbitrary constant, respectively.

Preferably, a maximum of the saturation enhancement function determining variable is determined based upon the visual perception characteristics of a predetermined color difference formula in a CIEL*a*b* color space.

Preferably, the color difference formula is defined by the following equation:

$$\Delta E_{LH} = \sqrt{\Delta L^2 + \Delta H^2}.$$

Here, $\Delta H$ and $\Delta L$ represent variations in hue and lightness, respectively. Preferably, the second color space is an HSV color space or a YCbCr color space.

Preferably, the saturation enhancement function in step (b) is determined based upon a preferred saturation enhancement value input from a user.

Preferably, step (b) includes (b1) receiving the preferred saturation enhancement value from the user, (b2) determining a saturation enhancement function determining variable based upon the preferred saturation enhancement value, and (b3) determining the saturation enhancement function based upon the saturation enhancement function determining variable.

Preferably, the saturation enhancement function determining variable is determined using the following equation:

$$a = A(a_{user}).$$

Here, a and $a_{user}$ represent the saturation enhancement function determining variable and a user-preferred saturation value, respectively.

Preferably, the saturation enhancement function determining variable and the saturation enhancement function are determined using the following equations:

$$a = A(a_{user})$$
$$S_o = F(S_i) = \frac{(a+1)S_i^2}{a + S_i^2}.$$

Here, F(x), a, $a_{user}$, $S_i$, and $S_o$ represent the saturation enhancement function, the saturation enhancement function determining variable, a user-preferred saturation value, saturation of the input image, and saturation of the output image, respectively.

Preferably, the saturation enhancement function determining variable and the saturation enhancement function are determined using the following equations:

$$a = A(a_{user})$$
$$S_o = F(S_i) = S_i + a \times \Delta.$$
$$\Delta = \frac{K \times S_i^2}{(K-1) + S_i^2} - S_i$$

Here, F(x), a, $a_{user}$, $S_i$, $S_o$, and K represent the saturation enhancement function, the saturation enhancement function determining variable, a user-preferred saturation value, saturation of the input image, saturation of the output image, and an arbitrary constant, respectively.

Preferably, a maximum of the saturation enhancement function determining variable is determined based upon the visual perception characteristics of a predetermined color difference formula in a CIEL*a*b* color space.

Preferably, the color difference formula is defined by the following equation:

$$\Delta E_{LH} = \sqrt{\Delta L^2 + \Delta H^2}.$$

Here, $\Delta H$ and $\Delta L$ represent variations in hue and lightness, respectively.

According to another aspect of the present invention, there is provided an apparatus for adaptively enhancing the color of an image. The apparatus includes a saturation component deriving unit for deriving a saturation component from an input image, a saturation enhancement function determining variable calculator for determining a saturation enhancement function used to enhance the saturation of the input image based upon a predetermined reference value, a saturation enhancement unit for changing the derived saturation component using the saturation enhancement function, and a saturation component synthesizing unit for synthesizing the changed saturation component and other components of the input image and generating an output image based upon the synthesized components.

Preferably, the apparatus further includes a first color converter for converting the input image represented in a first color space into an image in a second color space where the saturation of the input image can be extracted, and a second color converter for converting the output image represented in the second color space into an image in the first color space.

Preferably, the apparatus further includes a frame saturation average calculator which calculates an average saturation of the input image that is provided to the saturation enhancement function determining variable calculator as the reference value.

Preferably, the saturation enhancement function determining calculator determines the saturation enhancement function by which the amount by which the saturation of an input pixel in a low-saturation region is enhanced is small, and the amount by which the saturation of an input pixel in a high-saturation region is enhanced is large.

Preferably, the saturation enhancement function determining variable calculator determines the saturation enhancement function based upon the characteristics of the input image.

Preferably, the reference value is the average saturation of the input image, and the saturation enhancement function determining variable calculator determines the saturation enhancement function determining variable based upon the average saturation of the input image and determines the saturation enhancement function based upon the saturation enhancement function determining variable.

Preferably, the saturation enhancement function determining variable calculator determines the saturation enhancement function determining variable using the following equation:

$$a = A(S_{avg}).$$

Here, a and $S_{avg}$ represent the saturation enhancement function determining variable and an average saturation of the input image, respectively.

Preferably, the saturation enhancement function determining variable calculator determines the saturation enhancement function determining variable and the saturation enhancement function using the following equations:

$$a = A(S_{avg})$$
$$S_o = F(S_i) = \frac{(a+1)S_i^2}{a + S_i^2}.$$

Here, F(x), a, $S_{avg}$, $S_i$, and $S_o$ represent the saturation enhancement function, the saturation enhancement function determining variable, an average saturation of the input image, saturation of the input image, and saturation of the output image, respectively.

Preferably, the saturation enhancement function determining variable calculator determines the saturation enhancement function determining variable and the saturation enhancement function using the following equations:

$$a = A(S_{avg})$$
$$S_o = F(S_i) = S_i + a \times \Delta.$$
$$\Delta = \frac{K \times S_i^2}{(K-1) + S_i^2} - S_i$$

Here, F(x), a, $S_{avg}$, $S_i$, $S_o$, and K represent the saturation enhancement function, the saturation enhancement function determining variable, an average saturation of the input image, saturation of the input image, saturation of the output image, and an arbitrary constant, respectively.

Preferably, a maximum of the saturation enhancement function determining variable is determined based upon the visual perception characteristics of a predetermined color difference formula in a CIEL*a*b* color space.

Preferably, the color difference formula is defined by the following equation:

$$\Delta E_{LH} = \sqrt{\Delta L^2 + \Delta H^2}.$$

Here, ΔH and ΔL represent variations in hue and lightness, respectively.

Preferably, the saturation enhancement function determining variable calculator determines the saturation enhancement function based upon a preferred saturation enhancement value input from a user.

Preferably, the reference value is a preferred saturation enhancement value input from a user, and the saturation enhancement function determining variable calculator determines the saturation enhancement function determining variable based upon the preferred saturation enhancement value input from the user and the saturation enhancement function based upon the saturation enhancement function determining variable.

Preferably, the saturation enhancement function determining variable calculator determines the saturation enhancement function determining variable using the following equation:

$$a = A(a_{user}).$$

Here, a and $a_{user}$ represent the saturation enhancement function determining variable and a user-preferred saturation value, respectively.

Preferably, the saturation enhancement function determining variable calculator determines the saturation enhancement function determining variable and the saturation enhancement function using the following equations:

$$a = A(a_{user})$$
$$S_o = F(S_i) = \frac{(a+1)S_i^2}{a + S_i^2}.$$

Here, F(x), a, $a_{user}$, $S_i$, and $S_o$ represent the saturation enhancement function, the saturation enhancement function determining variable, a user-preferred saturation value, saturation of the input image, and saturation of the output image, respectively.

Preferably, the saturation enhancement function determining variable calculator determines the saturation enhancement function determining variable and the saturation enhancement function using the following equations:

$$a = A(a_{user})$$
$$S_o = F(S_i) = S_i + a \times \Delta.$$
$$\Delta = \frac{K \times S_i^2}{(K-1) + S_i^2} - S_i$$

Here, F(x), a, $a_{user}$, $S_i$, $S_o$, and K represent the saturation enhancement function, the saturation enhancement function determining variable, a user-preferred saturation value, saturation of the input image, saturation of the output image, and an arbitrary constant, respectively.

Preferably, a maximum of the saturation enhancement function determining variable is determined based upon the visual perception characteristics of a predetermined color difference formula in a CIEL*a*b* color space.

Preferably, the color difference formula is defined by the following equation:

$$\Delta E_{LH} = \sqrt{\Delta L^2 + \Delta H^2}.$$

Here, ΔH and ΔL represent variations in hue and lightness, respectively.

Preferably, the second color space is an HSV color space or a YcbCr color space.

According to the present invention, it is possible to represent an input image to automatically have an optimum saturation while preventing saturation clipping and maintaining the hue and lightness of the input image. In addition, it is possible to prevent low-saturation regions from being excessively saturation-enhanced by taking advantage of the characteristics of a saturation enhancement function. In addition, it is possible to automatically represent an image with an optimum saturation while minimizing the hue and lightness of the image. Even when a user arbitrarily adjusts the saturation of the image, the present invention can prevent saturation clipping and suppress the saturation of low-saturation portions of the image from being unnaturally enhanced.

BRIEF DESCRIPTION OF THE DRAWINGS

The above and other features and advantages of the present invention will become more apparent by describing in detail preferable embodiments thereof with reference to the attached drawings in which.

DETAILED DESCRIPTION OF THE INVENTION

Hereinafter, the present invention will be described in greater detail with the reference to the accompanying drawings in which preferred embodiments of the invention are shown.

Figure 1:
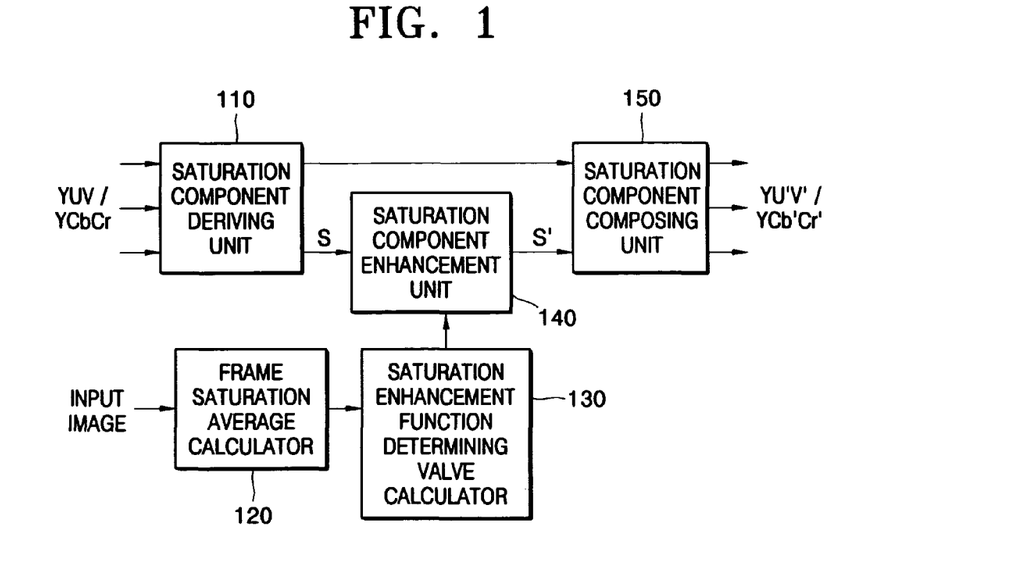
FIG. 1 is a block diagram of an apparatus for adaptively enhancing saturation using an average saturation according to a preferable embodiment of the present invention.

FIG. 1 is a block diagram of an apparatus for adaptively enhancing saturation according to a preferred embodiment of the present invention.

Referring to FIG. 1, the apparatus for adaptively enhancing saturation according to a preferred embodiment of the present invention includes a saturation component deriving unit 110, a frame saturation average calculator 120, a saturation enhancement determining value calculator 130, a saturation component enhancement unit 140, and a saturation component synthesizing unit 150.

The saturation component deriving unit 110 derives a saturation component from an input image. The input image is represented in a predetermined color space, such as YUV color space, YCbCr color space, and so on. The saturation component deriving unit 110 outputs the derived saturation component to the saturation component enhancement unit 140, and outputs other components of the input image to the saturation component synthesizing unit 150. In case that the input image is represented in the YcbCr color space, the saturation component deriving unit 110 derives the saturation component from the input image by following Equation (1) or (2).

$$S = \beta\sqrt{Cr^2 + Cb^2} \quad (1)$$

$$S = \frac{Cb}{Cb_{max}} \text{ or } S = \frac{Cr}{Cr_{max}} \quad (2)$$

In the Equation (1), $\beta$ is an adjustable variable, and in the Equation (2), $Cr_{max}$ and $Cb_{max}$ are maximum color components of the input image at the brightness value Y. $\beta$, $Cr_{max}$ and $Cb_{max}$ are used to adjust a range of saturation component value appropriate to a characteristic of the YCbCr color space. The color components Cb and Cr can vary from the brightness value Y in the YCbCr color space.

The frame saturation average calculator 120 calculates an average saturation $S_{avg}$ of the input image and outputs the calculated average saturation $S_{avg}$ to the saturation enhancement determining value calculator 130. When the size of the input image is N×M, the average saturation $S_{avg}$ can be obtained by Equation (3).

$$S_{avg} = \frac{1}{NM} \sum_{i=1}^{NM} S_i \quad (3)$$

Here, $S_i$ is a saturation value of each frame composing the input image.

The saturation enhancement determining value calculator 130 calculates a saturation enhancement function determining variable a by Equation (4) based upon the average saturation $S_{avg}$. The saturation enhancement function determining variable a is a factor for determining an amount of saturation enhancement of an output saturation and is determined by the average saturation $S_{avg}$.

$$a = A(S_{avg}) \quad (4)$$

The saturation component enhancement unit 140 determines the saturation of each pixel of the input image using a saturation enhancement function determined by the saturation enhancement function determining variable a and adjusts the saturation component input from the saturation component deriving unit 110. The saturation component enhancement unit 140 adjusts the saturation component by Equation (5).

$$S' = F(S) \quad (5)$$

Here, the saturation enhancement function F is a function deriving the output saturation component S' from the input saturation component S. The saturation component synthesizing unit 150 synthesizes the adjusted saturation component input from the saturation component enhancement unit 140 and other components of the input image input from the saturation component deriving unit 110. The saturation component synthesizing unit 150 generates an output image according to the synthesized components. Furthermore, the saturation component synthesizing unit 150 can convert the color space of the output image into other color space, for example, RGB color space, adequate to a certain display device.

Figure 2:
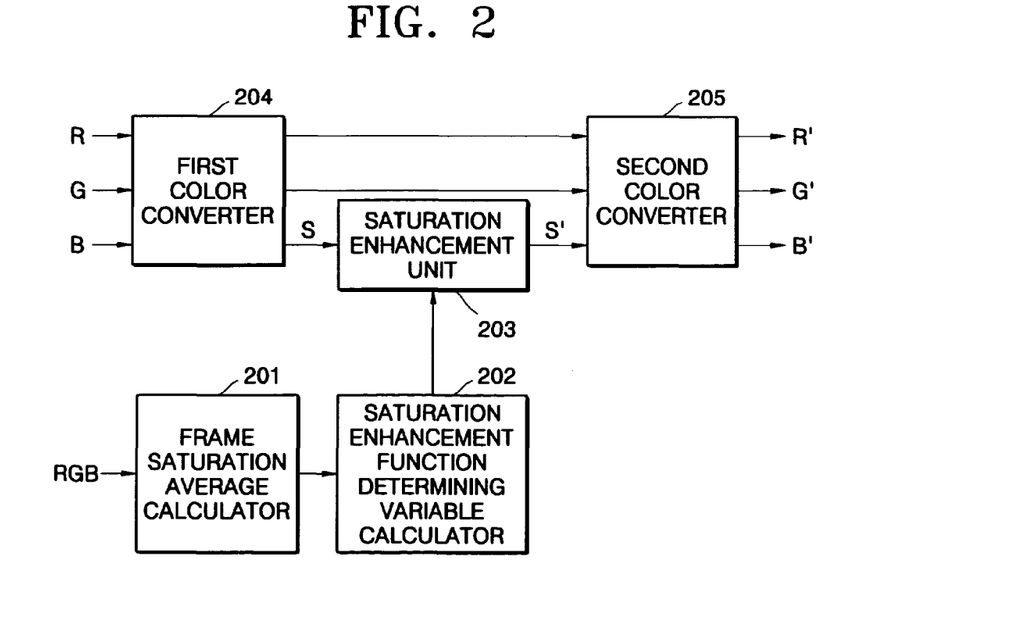
FIG. 2 is a block diagram of an apparatus for adaptively enhancing saturation using an average saturation according to another preferable embodiment of the present invention.
Figure 3:
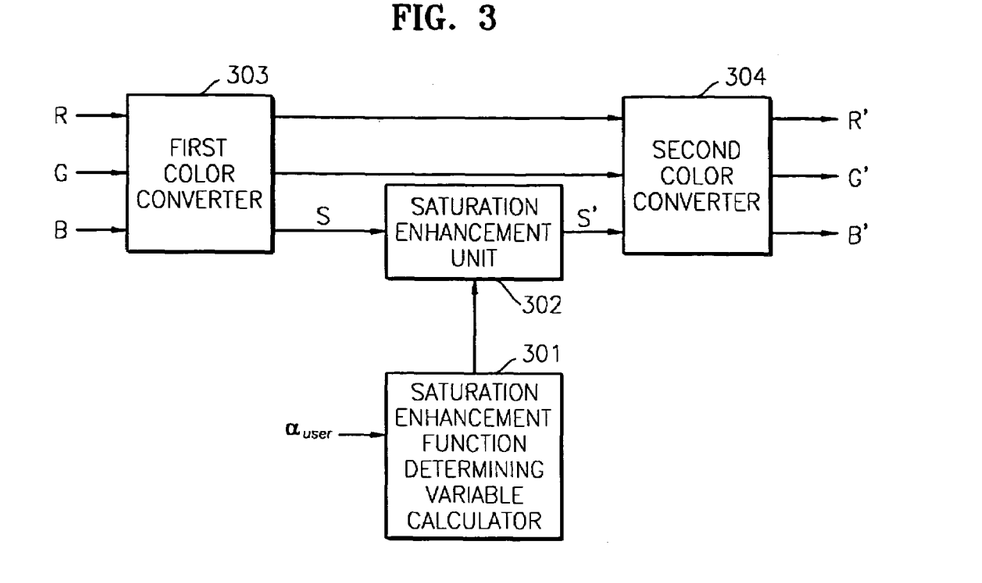
FIG. 3 is a block diagram illustrating an apparatus for adaptively enhancing saturation based upon user setting according to another preferred embodiment of the present invention.

FIG. 2 is a block diagram of an apparatus for adaptively enhancing saturation according to another preferred embodiment of the present invention, and FIG. 3 is a block diagram of an apparatus for adaptively enhancing saturation according to user setting according to a preferred embodiment of the present invention.

Referring to FIGS. 2 and 3, a frame saturation average calculator 201 shown in FIG. 3 obtains the saturation of a frame image of moving images or an input image in order to adaptively enhance the saturation of the input image. Supposing that the size of the input image is N×M, saturation S can be defined by Equation (6), and average saturation $S_{avg}$ can be defined by Equation (7).

$$S = \frac{\max(R, G, B) - \min(R, G, B)}{\max(R, G, B)} \quad (6)$$

$$S_{avg} = \frac{1}{NM} \sum_{i=1}^{NM} S_i \quad (7)$$

Referring to FIG. 2, a saturation enhancement function determining variable calculator 202 obtains a saturation enhancement function determining variable a by following Equation (8) with the use of an average saturation obtained from Equation (7). Here, the saturation enhancement function determining variable a is a factor for determining the amount by which the output saturation of an input image is increased, and is determined by the average saturation of the input image.

$$a = A(S_{avg}) \quad (8)$$

Referring to FIG. 3, a saturation enhancement function determining variable calculator 301 receives a saturation value $a_{user}$ preferred by a user from the user and obtains the saturation enhancement function determining variable a, as shown in Equation (9). In other words, the saturation enhancement function determining variable a may be arbitrarily set based on the user-preferred saturation value $a_{user}$. Here, the user-preferred saturation value $a_{user}$ is between 0 and 1.

$$a = A(a_{user}) \quad (9)$$

As shown in FIGS. 2 and 3, a saturation enhancement unit 203 or 302 determines a saturation enhancement function based on the saturation enhancement function determining variable a. In other words, the saturation enhancement unit 203 or 302 applies the saturation enhancement function determining variable a defined by Equations (8) and (9) for the saturation of each pixel the saturation of each pixel to a saturation enhancement function shown in Equation (10).

$$S_o = F(S_i) \quad (10)$$

Figure 4:
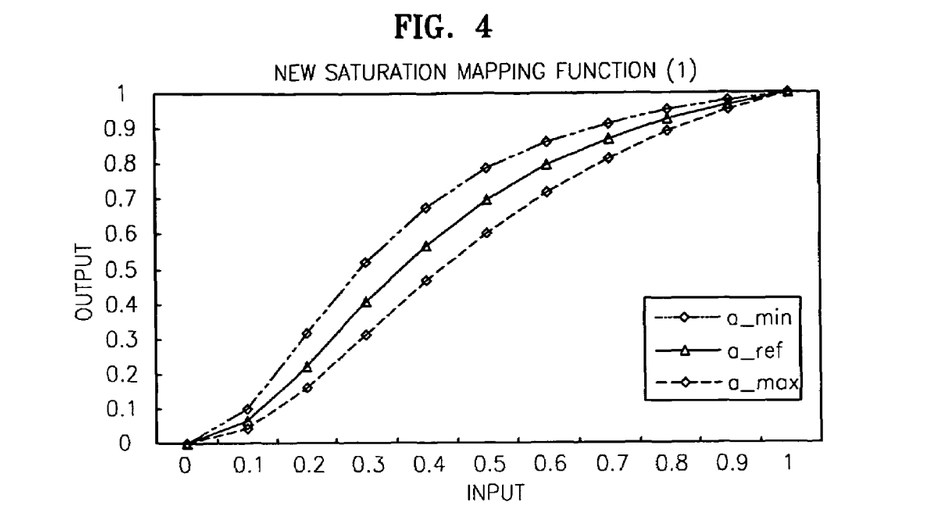
FIG. 4 is a graph showing the characteristics of input and output data obtained by using Method 1 in a saturation enhancement unit shown in FIG. 3.

Here, the saturation enhancement function F is a function deriving an output saturation $S_o$, which is enhanced from the input saturation $S_i$ of each pixel by a certain amount, and shows the characteristics shown in FIG. 4 depending on the saturation enhancement function determining variable a. In other words, the amount by which the saturation of each pixel is increased is small in a low saturation region and is large in a high saturation region.

As shown in FIGS. 2 and 3, a first color converter 204 or 303 obtains H, S, and V values from the R, G, and B values of an input pixel, which is shown in Equation (11).

$$V = \frac{\max(R, G, B)}{255} \quad (11)$$

$$S = \frac{\max(R, G, B) - \min(R, G, B)}{\max(R, G, B)}$$

$$H_1 = \cos^{-1} \frac{0.5\{(R-G) + (R-B)\}}{\sqrt{(R-G)^2 + (R-G)(G-B)}}$$

if $B > G$, $H = 360° - H_1$ else, $H = H_1$

As shown in FIGS. 2 and 3, a second color converter 205 or 304 converts H, S, and V values having the enhanced saturation value $S_o$ into R, G, and B values, which will be described in the following.

First, hue H, which is represented by degrees between 0° and 360°, is converted into a number between 0 and 6 by dividing it by 60 and is divided into an integer int_H and a decimal fraction decimal_H, which is shown in the following equation.

$$H = \frac{H}{60} \quad (12)$$

$$H = \text{int\_H} + \text{decimal\_H}$$

Values used for generating R, G, and B values can be derived from Equation (13) based on lightness V and the enhanced saturation $S_o$.

$$p = V \times (1 - S_o)$$

$$q = V \times (1 - S_o \times \text{decimal\_H})$$

$$t = V \times (1 - S_o \times (1 - \text{decimal\_H})) \quad (13)$$

The R, G, and B values can be obtained by the following values based on the hue H in the following equation.

if $int\_H = 0$, $R = 255 \times V$, $G = 255 \times t$, $B = 255 \times p$ if $int\_H = 1$, $R = 255 \times q$, $G = 255 \times V$, $B = 255 \times p$ if $int\_H = 2$, $R = 255 \times p$, $G = 255 \times V$, $B = 255 \times t$ if $int\_H = 3$, $R = 255 \times p$, $G = 255 \times q$, $B = 255 \times V$ if $int\_H = 4$, $R = 255 \times t$, $G = 255 \times p$, $B = 255 \times V$ if $int\_H = 5$, $R = 255 \times V$, $G = 255 \times p$, $B = 255 \times q$ (14)

Hereinafter, the operation of the present invention and two methods for determining Equations (8), (9), and (10) will be described. In the present invention, an HSV color space, which is represented by hue, saturation, and value, is used in order to minimize the variation of hue and lightness and to prevent clipping in a case where a user arbitrarily adjusts the amount by which the saturation of a pixel is increased. According to the present invention, it is possible to prevent clipping by calculating a saturation value (S), as shown in Equation (6), based on one of R, G, and B factors that is most likely to cause clipping such that the saturation value (S) can be prevented from exceeding a RGB color range. In addition, as compared with other color spaces, the HSV color space can represent colors as most similar to the ones recognized by human vision, and can process achromatic elements and chromatic elements separately. In addition, in the HSV color space, it is possible to maintain hue irrespective of the variation of saturation because saturation has almost nothing to do with hue.

On the other hand, there is a method for enhancing saturation by the same amount without considering the saturation of each portion of an input image in order to represent the image as clearly as the one that is recognized by human vision. This method, however, fails to continuously maintain the saturation of moving images at an enhanced level and only provides unnatural images on a screen. In order to adaptively enhance saturation, the amount by which the saturation of an input image is increased must be small when the original saturation of the input image is low. On the other hand, when the original saturation of the input image is high, the amount by which the saturation of the input image is increased may be great. In addition, in the case of enhancing the saturation of an input image a lot, a certain portion of the input image representing an image of an achromatic color, like an image of cloud, must be prevented from being unnaturally saturation-enhanced. In order to solve the above-mentioned problems, the present invention adopts an adaptive saturation enhancement function which is determined by the average saturation of an input image, as shown in Equation (8). Equation (9) shows the way an adaptive saturation enhancement function is determined based on a saturation value preferred by a user. The present invention provides Methods 1 and 2 for determining Equations (8), (9), and (10).

[Method 1]

$$a = A(S_{avg}) = a_{max} - a_{ref} \times S_{avg} \qquad (15)$$

$$a = A(a_{user}) = a_{max} - (a_{max} - a_{min}) \times a_{user} \qquad (16)$$

$$S_o = F(S_i) = \frac{(a+1)S_i^2}{a + S_i^2} \qquad (17)$$

Figure 5:
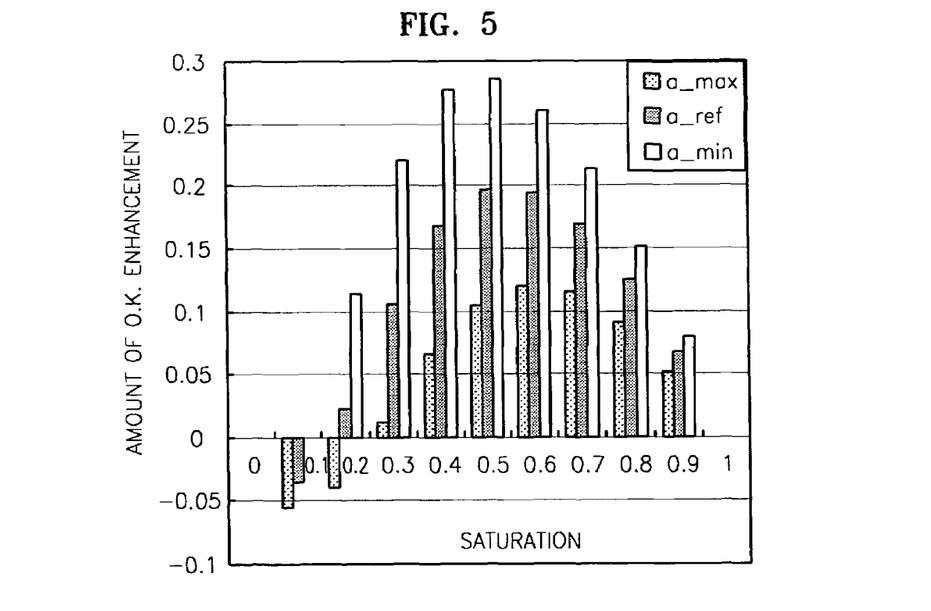
FIG. 5 is a graph showing the distribution of increases in saturation with respect to variables for determining a saturation enhancement function such that the input/output characteristics shown in FIG. 4 can be obtained.

In Method 1, the saturation enhancement function determining variable a is obtained using Equations (15) and (16) rather than Equations (8) and (9), and the saturation enhancement function F is determined using Equation (17) rather than Equation (10). FIG. 4 is a graph showing the characteristics of input and output data obtained by using Method 1 in a saturation enhancement unit shown in FIG. 3, and FIG. 5 is a graph showing the distribution of increases in saturation with respect to variables for determining a saturation enhancement function such that the input/output characteristics shown in FIG. 4 can be obtained.

According to this method, a minimum $a_{min}$ of the saturation enhancement function determining variable a is set to 0.1 in order to maintain the saturation of a region having a low saturation of below 0.1. In addition, in order to obtain a maximum $a_{max}$ of the saturation enhancement function determining variable a and a saturation proportional coefficient $a_{ref}$ of an input image, a color difference formula in a CIEL*a*b* color space is used so that hue and lightness can be varied within a range where human vision cannot recognize such variations.

Human vision can recognize a color difference when a color difference formula $\Delta E_{ab}$ is not smaller than 3 in an equalized color space, i.e., CIEL*a*b*. Here, in the CIEL*a*b* color space, three components including lightness, saturation, and hue can be extracted, and the color difference formula $\Delta E_{ab}$ in the CIEL*a*b* color space can be expressed by Equation (18), which can be converted into Equation (19).

$$\Delta E_{ab} = \Delta E_{ch} = \sqrt{\Delta L^2 + \Delta C^2 + \Delta H^2} \qquad (18)$$

$$\Delta E_{ab}^2 - \Delta C^2 = \Delta L^2 + \Delta H^2 \qquad (19)$$

When a color difference formula $\Delta E_{LH}$ is defined as a measure of the variation of hue H and lightness L, it can be expressed by the following equation.

$$\Delta E_{LH} = \sqrt{\Delta L^2 + \Delta H^2} = \sqrt{\Delta E_{ab}^2 - \Delta C^2} \qquad (20)$$

Human vision can recognize variations in hue and lightness when $\Delta E_{LH}$ is not smaller than 3.

In other words, according to the present invention, the maximum $a_{max}$ of the saturation enhancement function determining variable a and the saturation proportional coefficient $a_{ref}$ are determined in advance so that the color difference $\Delta E_{LH}$ between an input image and an output image having an enhanced saturation can be smaller than 3. Accordingly, it is possible to obtain an output image having an optimal saturation with the use of only the saturation characteristics of an input image while minimizing the variation of hue and lightness.

As shown in FIG. 5, the saturation enhancement function of Method 1 has a saturation increase of no greater than 0 in a range of low saturation, in other words, in a range where a saturation is no greater than 0.1. On the other hand, in a range where a saturation is higher than 0.1, the amount by which saturation is increased begins to increase, showing the shape of a standard normal curve. This saturation enhancement function enhances the saturation of an input image having a low average saturation less considerably. However, this saturation enhancement function enhances the contrast of such a low saturation input image by lowering the saturation of certain portions of the input image having a lower saturation than the others.

[Method 2]

$$a = A(S_{avg}) = S_{avg} \qquad (21)$$

$$a = A(a_{user}) = a_{user} \qquad (22)$$

$$S_o = F(S_i) = S_i + a \times \Delta \qquad (23)$$

$$\Delta = \frac{K \times S_i^2}{(K-1) + S_i^2} - S_i$$

Figure 6:
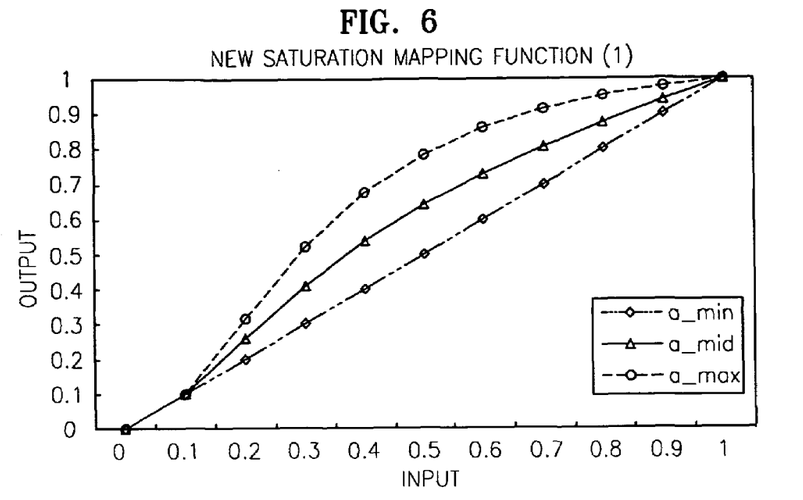
FIG. 6 is a graph showing the characteristics of input and output data obtained by using Method 2 in the saturation enhancement unit shown in FIG. 3.

In Method 2, the saturation enhancement function determining variable a is obtained using Equations (21) and (22) rather than Equations (8) and (9), and the saturation enhancement function F is determined using Equation (23) rather than Equation (10). FIG. 6 is a graph showing the characteristics of input and output data obtained by using Method 2 in the saturation enhancement unit shown in FIG. 3, and FIG. 7 is a graph showing the distribution of increases in saturation with respect to variables for determining a saturation enhancement function such that the input/output characteristics shown in FIG. 6 can be obtained.

Figure 7:
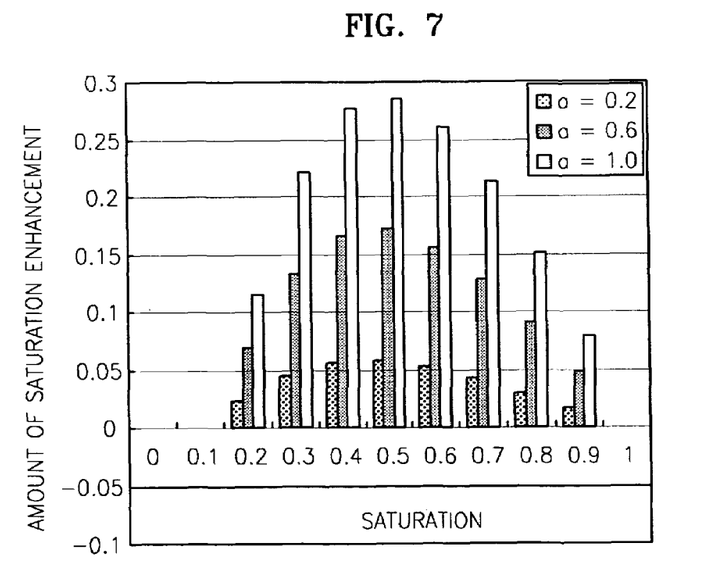
FIG. 7 is a graph showing the distribution of increases in saturation with respect to variables for determining a saturation enhancement function such that the input/output characteristics shown in FIG. 6 can be obtained.

As shown in FIGS. 6 and 7, the characteristics of Method 2 in terms of the maximum amount of saturation enhancement are the same as those of Method 1. The characteristics of Method 2 in terms of the minimum amount of saturation enhancement are the same as the saturation characteristics of original input images. Middle saturation enhancement is determined by interpolation with the use of the maximum and minimum amounts of saturation enhancement. In preferred embodiments of the present invention, a maximum saturation enhancement determining constant K is set to 1.15.

According to the saturation enhancement function of Method 2, as shown in FIG. 7, the saturation of a low-saturation region, i.e., a region having a saturation of no greater than 0.1, is enhanced by 0. On the other hand, in a range where a saturation is higher than 0.1, the amount by which saturation is increased begins to increase, showing the shape of a standard normal curve.

Figure 8A:
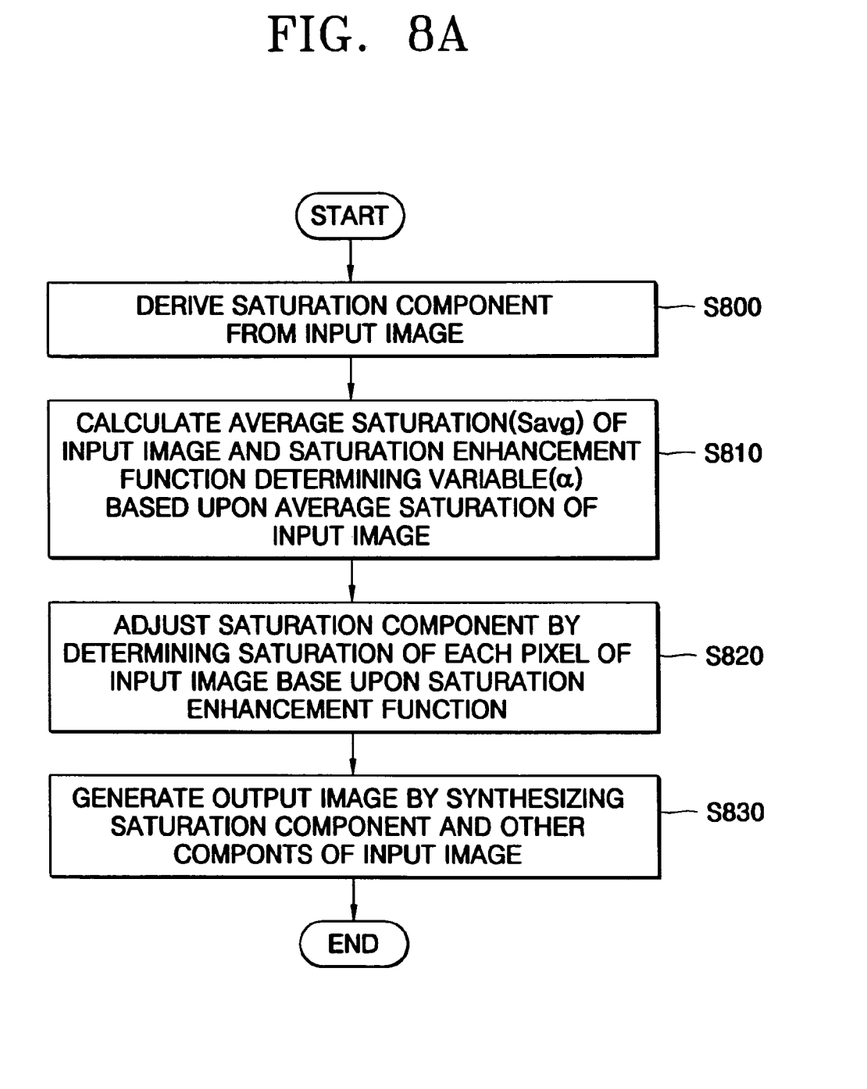
FIG. 8A is a flowchart of a method for adaptively enhancing saturation using the average saturation shown in FIG. 1 according to a preferred embodiment of the present invention.
Figure 8B:
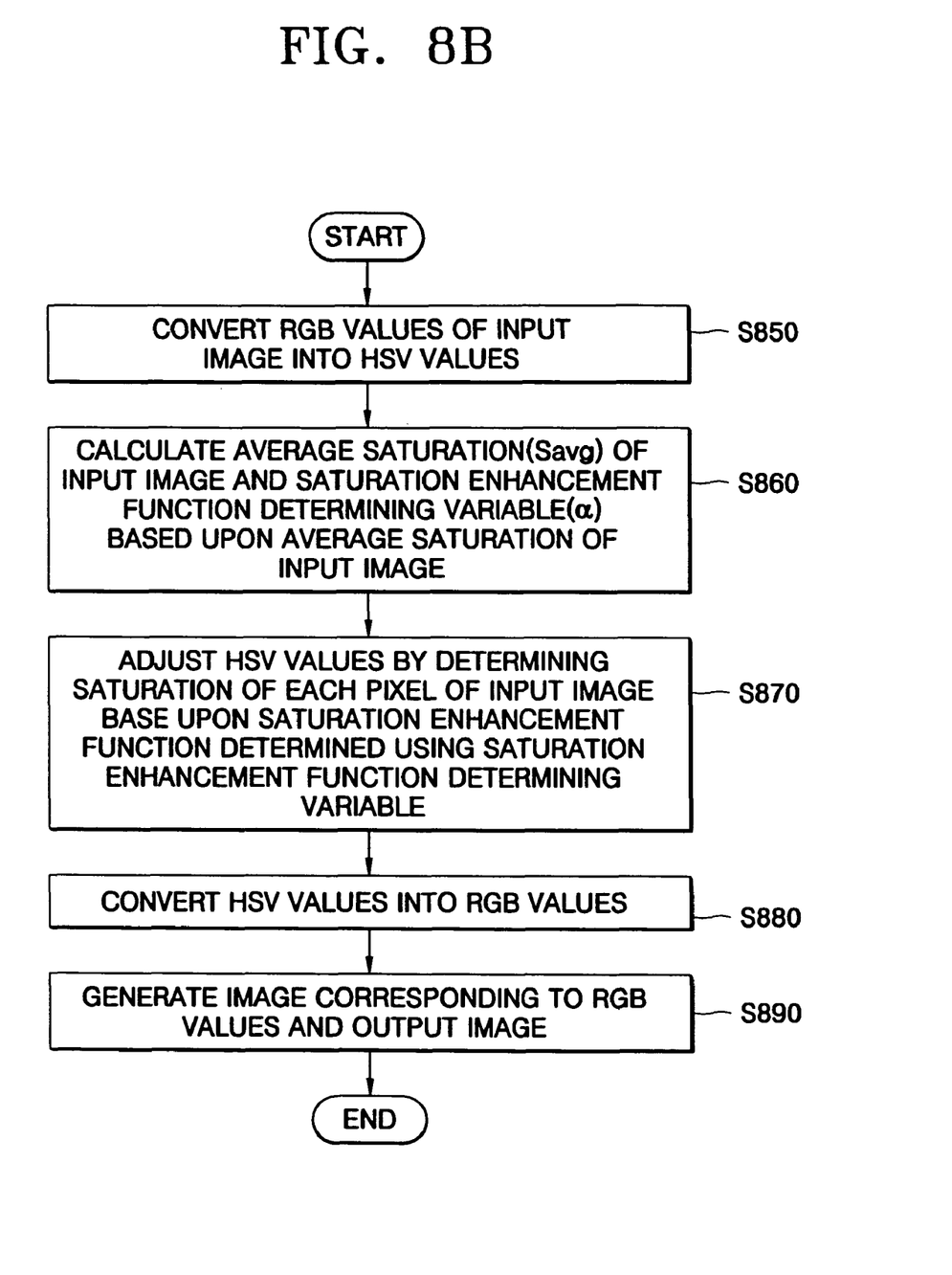
FIG. 8B is a flowchart of a method for adaptively enhancing saturation using the average saturation shown in FIG. 2 according to another preferred embodiment of the present invention.

FIGS. 8A and 8B are flowcharts of a method for adaptively enhancing the saturation of an image according to preferable embodiments of the present invention. In FIG. 8A, the average saturation of the entire image can be derived from Equations (3), and in FIG. 8B, the average saturation of the entire image can be derived from Equations (6) and (7). Furthermore, in FIGS. 8A and 8B, a saturation enhancement function determining variable can be derived from Equation (4) and Equation (8) respectively.

Referring to FIG. 8A, in step S800, the saturation component deriving unit 110 derives a saturation component from an input image represented in a predetermined color space, such as YUV color space, YCbCr color space, and so on. In step 810, the frame saturation average calculator 120 calculates an average saturation $S_{avg}$, and the saturation enhancement determining value calculator 130 calculates a saturation enhancement function determining variable based upon the calculated average saturation $S_{avg}$. In step S820, the saturation component enhancement unit 140 determines the saturation of each pixel of the input image using a saturation enhancement function determined by the saturation enhancement function determining variable a and adjusts the saturation component input from the saturation component deriving unit 110. In step S830, The saturation component synthesizing unit 150 synthesizes the adjusted saturation component input from the saturation component enhancement unit 140 and other components of the input image input from the saturation component deriving unit 110.

Referring to FIG. 8B, in step S850, RGB values of an input image represented in an RGB color space is converted into HSV values in an HSV color space where the saturation of the input image can be extracted. In step S860, the frame saturation average calculator 201 calculates an average saturation $S_{avg}$, and the saturation enhancement determining value calculator 202 a saturation enhancement function determining variable a based upon the calculated average saturation $S_{avg}$. Here, the order of steps S850 and S860 may be varied, if necessary. In step S870, the saturation enhancement unit 203 determines the saturation of each pixel of the input image using a saturation enhancement function determined by the saturation enhancement function determining variable a and adjusts the HSV values obtained in step S850. The second color converter 205 converts the adjusted HSV values back into RGB values in step S880 and outputs an image corresponding to the RGB values in step S890.

Figure 9A:
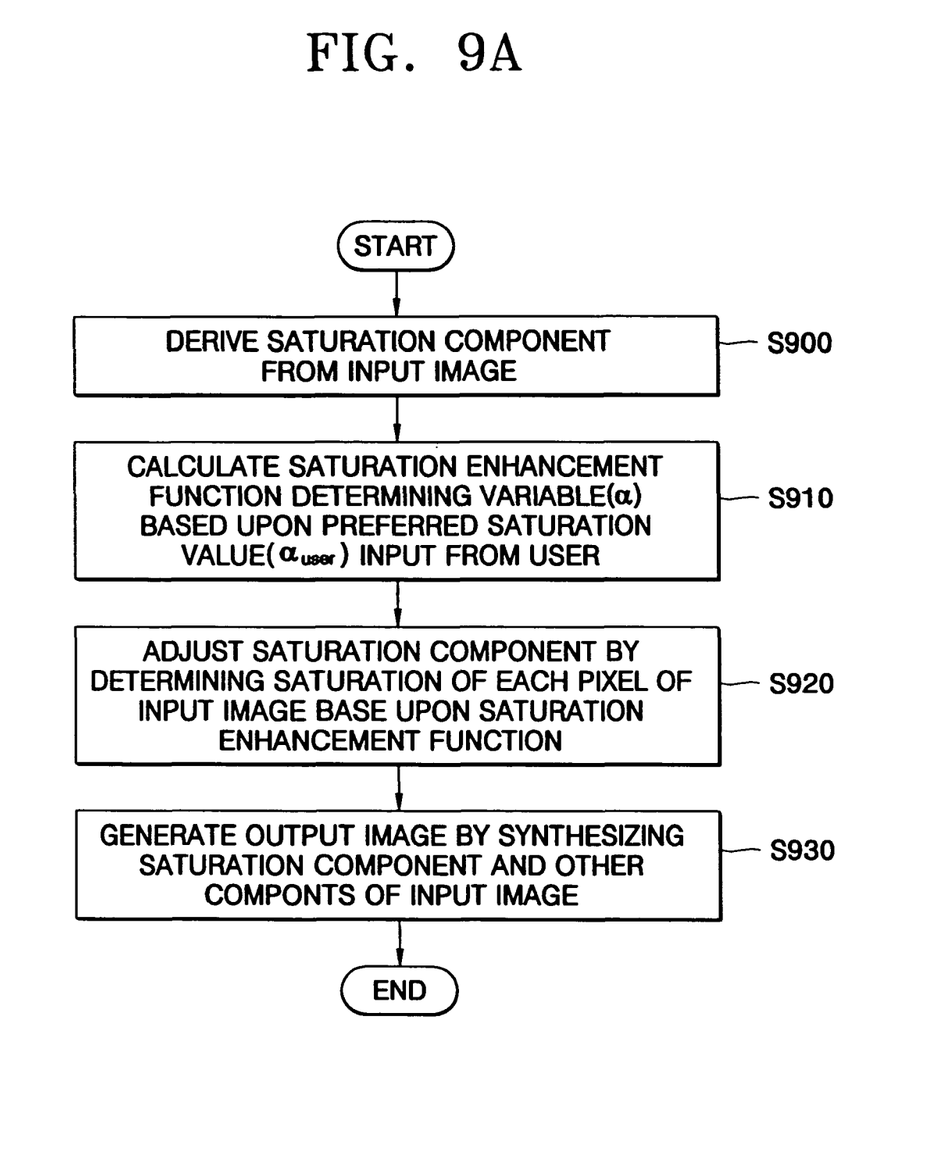
FIG. 9A is a flowchart of a method for adaptively enhancing saturation based upon saturation preferred and set by a user, a process shown in FIG. 1 according to a preferred embodiment of the present invention.
Figure 9B:
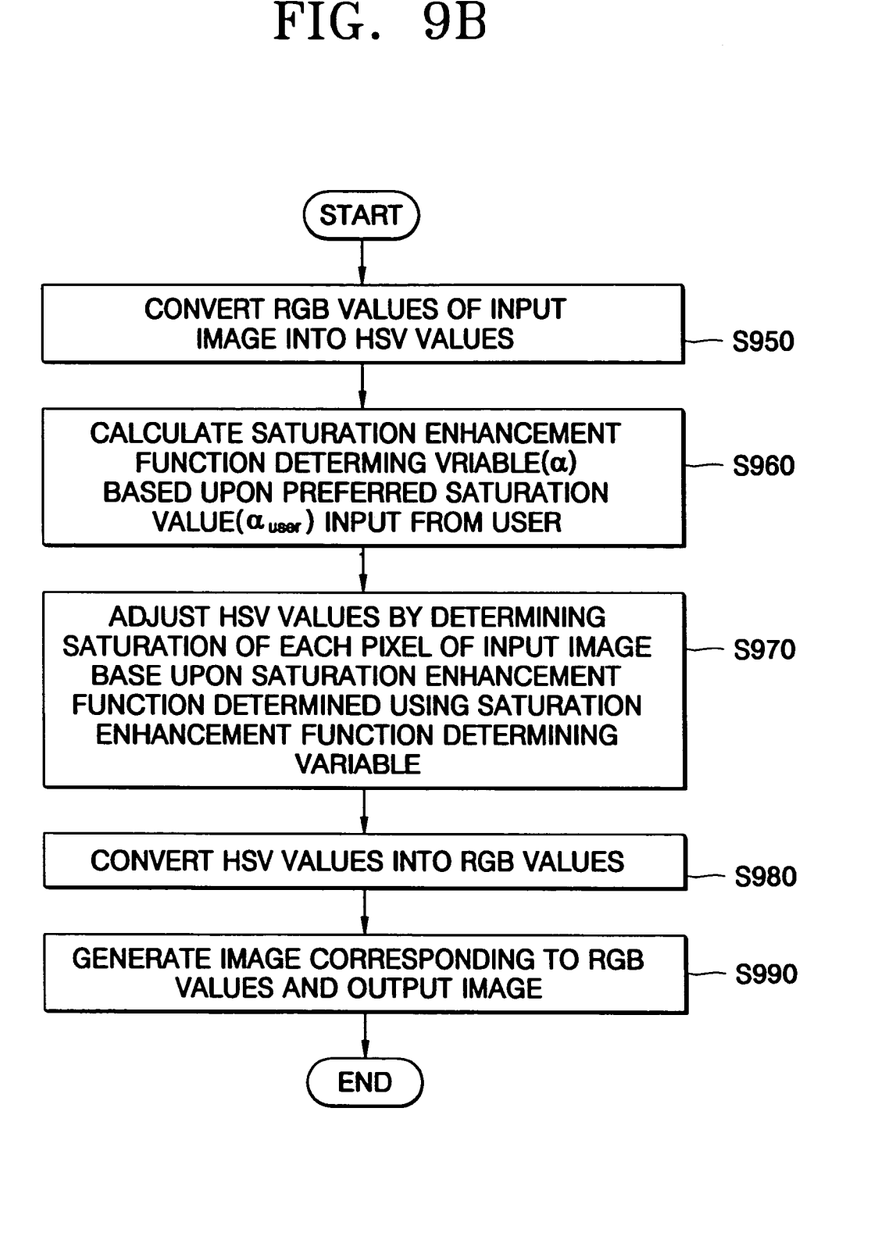
FIG. 9B is a flowchart of a method for adaptively enhancing saturation based upon saturation preferred and set by a user, a process shown in FIG. 3 according to another preferred embodiment of the present invention.

FIGS. 9A and 9B are flowcharts of a method for adaptively enhancing the saturation of an image based upon user setting according to preferred embodiments of the present invention.

In this method, a saturation enhancement function determining variable a can be derived from Equation (9) based on a user setting variable.

Referring to FIG. 9A, in step S900, the saturation component deriving unit 110 derives a saturation component from an input image represented in a predetermined color space, such as YUV color space, YCbCr color space, and so on. In step 910, the saturation enhancement determining value calculator 130 calculates a saturation enhancement function determining variable based upon a user-preferred saturation value $a_{user}$ input from a user. In step 920, the saturation component enhancement unit 140 determines the saturation of each pixel of the input image using a saturation enhancement function determined by the saturation enhancement function determining variable a and adjusts the saturation component input from the saturation component deriving unit 110. In step S930, The saturation component synthesizing unit 150 synthesizes the adjusted saturation component input from the saturation component enhancement unit 140 and other components of the input image input from the saturation component deriving unit 110.

Referring to FIG. 9B, in step S950, the first color converter 303 converts RGB values of an input image represented in an RGB color space into HSV values in an HSV color space where the saturation of the input image can be extracted. The saturation function determining variable calculator 301 calculates the saturation enhancement function determining variable a based upon a user-preferred saturation value $a_{user}$ input from a user in step S960. In step S970, the saturation enhancement unit 302 determines the saturation of each pixel of the input image based upon a saturation enhancement function determined by the saturation enhancement function determining variable a and adjusts the HSV values obtained in step S950. The second color converter 304 converts the adjusted HSV values back into RGB values in step S980 and outputs an image corresponding to the RGB values in step S990.

The above-described embodiments of the present invention can be realized as programs that can be written on a recording medium and can be executed in a commonly-used digital computer. In addition, the above-described embodiments of the present invention can be realized as computer chips and can be executed in a commonly-used digital computer, such as a digital television set.

Here, the recording medium that can be read by a computer may include a magnetic storage, such as a ROM, a floppy disk, or a hard disk, and an optically recording medium, such as a CD-ROM, a DVD, or carrier wave (for example, transmission through the Internet).

As described above, according to the present invention, it is possible to automatically represent images having an optimal saturation while maintaining hue and lightness by defining a saturation enhancement function in an HSV color space based on the average saturation of input images and enhancing the saturation of the input images based on the saturation enhancement function. In addition, the present invention can prevent clipping. Moreover, the present invention can prevent a low saturation region from being excessively saturation-enhanced due to the characteristics of the saturation enhancement function.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for adaptively enhancing a color comprising:
   (a) deriving a saturation component from an input image;
   (b) determining a saturation enhancement function used to enhance the saturation of the input image according to a saturation enhancement function determining variable based on one of an average saturation of the input image and a preferred saturation enhancement value;
   (c) changing the derived saturation component using the saturation enhancement function;
   (d) generating an output color value by synthesizing the changed saturation component and other components of the input image; and
   (e) generating an output image based upon the output color value by maintaining a hue and lightness of the input image and preventing saturation clipping based on the saturation enhancement function determining variable.

2. The method of claim 1, wherein step (a) comprises;
   (a1) converting an input image represented in a first color space into an image in a second color space where the saturation of the input image can be extracted; and
   (a2) deriving the saturation component from the converted input image.

3. The method of claim 1, wherein according to the saturation enhancement function, the amounts by which the saturation of an input pixel in a low-saturation region is enhanced and by which the saturation of an input pixel in a high-saturation region are different.

4. The method of claim 1, wherein the saturation enhancement function is determined based on the characteristics of the input image.

5. The method of claim 4, wherein step (b) comprises:
   (b1) extracting the average saturation of the input image from color signals of the input image;
   (b2) determining the saturation enhancement function determining variable based on the average saturation; and
   (b3) determining the saturation enhancement function based on the saturation enhancement function determining variable.

6. The method of claim 5, wherein the saturation enhancement function determining variable is determined using the following equation:

$$a = A(S_{avg})$$

where a and $S_{avg}$ represent the saturation enhancement function determining variable and the average saturation of the input image, respectively.

7. The method of claim 5, wherein the saturation enhancement function determining variable and the saturation enhancement function are determined using the following equations:

$$a = A(S_{avg})$$

$$S_o = F(S_i) = \frac{(a+1)S_i^2}{a + S_i^2}$$

where F(x), a, $S_{avg}$, $S_i$, and $S_o$ represent the saturation enhancement function, the saturation enhancement function determining variable, the average saturation of the input image, saturation of the input image, and saturation of the output image, respectively.

8. The method of claim 5, wherein the saturation enhancement function determining variable and the saturation enhancement function are determined using the following equations:

$$a = A(S_{avg})$$

$$S_o = F(S_i) = S_i + a \times \Delta$$

$$\Delta = \frac{K \times S_i^2}{(K-1) + S_i^2} - S_i$$

where F(x), a, $S_{avg}$, $S_i$, $S_o$, and K represent the saturation enhancement function, the saturation enhancement function determining variable, the average saturation of the input image, saturation of the input image, saturation of the output image, and an arbitrary constant, respectively.

9. The method of claim 5, wherein a maximum of the saturation enhancement function determining variable is determined based upon the visual perception characteristics of a predetermined color difference formula in a CIEL*a*b* color space.

10. The method of claim 9, wherein the color difference formula is defined by the following equation:

$$\Delta E_{LH} = \sqrt{\Delta L^2 + \Delta H^2}$$

where $\Delta H$ and $\Delta L$ represent variations in hue and lightness, respectively.

11. The method of claim 1, wherein the second color space is an HSV color space or a YCbCr color space.

12. The method of claim 1, wherein the saturation enhancement function in step (b) is determined based upon the preferred saturation enhancement value input from a user.

13. The method of claim 12, wherein step (b) comprises:
   (b1) receiving the preferred saturation enhancement value from the user;
   (b2) determining the saturation enhancement function determining variable based upon the preferred saturation enhancement value; and
   (b3) determining the saturation enhancement function based upon the saturation enhancement function determining variable.

14. The method of claim 13, wherein the saturation enhancement function determining variable is determined using the following equation:

$$a = A(a_{user})$$

where a and a user represent the saturation enhancement function determining variable and the preferred saturation enhancement value, respectively.

15. The method of claim 13, wherein the saturation enhancement function determining variable and the saturation enhancement function are determined using the following equations:

$$a = A(a_{user})$$

$$S_o = F(S_i) = \frac{(a+1)S_i^2}{a + S_i^2}$$

where F(x), a, $a_{user}$, $S_i$, and $S_o$ represent the saturation enhancement function, the saturation enhancement function determining variable, the preferred saturation enhancement value, saturation of the input image, and saturation of the output image, respectively.

16. The method of claim 13, wherein the saturation enhancement function determining variable and the saturation enhancement function are determined using the following equations:

$$a = A(a_{user})$$
$$S_o = F(S_i) = S_i + a \times \Delta$$
$$\Delta = \frac{K \times S_i^2}{(K-1) + S_i^2} - S_i$$

where F(x), a, $a_{user}$, $S_i$, $S_o$, and K represent the saturation enhancement function, the saturation enhancement function determining variable, the preferred saturation enhancement value, saturation of the input image, saturation of the output image, and an arbitrary constant, respectively.

17. The method of claim 13, wherein a maximum of the saturation enhancement function determining variable is determined based upon the visual perception characteristics of a predetermined color difference formula in a CIEL*a*b* color space.

18. The method of claim 17, wherein the color difference formula is defined by the following equation:

$$\Delta E_{LH} = \sqrt{\Delta L^2 + \Delta H^2}$$

where $\Delta H$ and $\Delta L$ represent variations in hue and lightness, respectively.

19. An apparatus for adaptively enhancing the color of an image, comprising:
a saturation component deriving unit for deriving a saturation component from an input image;
a saturation enhancement function determining variable calculator for determining a saturation enhancement function used to enhance the saturation of the input image based upon a saturation enhancement function determining variable based on one of an average saturation of the input image and a preferred saturation enhancement value;
a saturation enhancement unit for changing the derived saturation component using the saturation enhancement function; and
a saturation component synthesizing unit for synthesizing the changed saturation component and other components of the input image and generating an output image based upon the synthesized components by maintaining a hue and lightness of the input image and preventing saturation clipping based on the saturation enhancement function determining variable.

20. The apparatus of claim 19 further comprising:
a first color converter for converting the input image represented in a first color space into an image in a second color space where the saturation of the input image can be extracted; and
a second color converter for converting the output image represented in the second color space into an image in the first color space.

21. The apparatus of claim 19 further comprising a frame saturation average calculator which calculates the average saturation of the input image that is provided to the saturation enhancement function determining variable calculator.

22. The apparatus of claim 19, wherein the saturation enhancement function determining variable calculator determines the saturation enhancement function by which the amounts by which the saturation of an input pixel in a low-saturation region is enhanced and by which the saturation of an input pixel in a high-saturation region is enhanced are different.

23. The apparatus of claim 19, wherein the saturation enhancement function determining variable calculator determines the saturation enhancement function based upon the characteristics of the input image.

24. The apparatus of claim 19, wherein the saturation enhancement function determining variable calculator determines a saturation enhancement function determining variable based upon the average saturation of the input image and determines the saturation enhancement function based upon the saturation enhancement function determining variable.

25. The apparatus of claim 24, wherein the saturation enhancement function determining variable calculator determines the saturation enhancement function determining variable using the following equation:

$$a = A(S_{avg})$$

where a and $S_{avg}$ represent the saturation enhancement function determining variable and the average saturation of the input image, respectively.

26. The apparatus of claim 24, wherein the saturation enhancement function determining variable calculator determines the saturation enhancement function determining variable and the saturation enhancement function using the following equations:

$$a = A(S_{avg})$$
$$S_o = F(S_i) = \frac{(a+1)S_i^2}{a + S_i^2}$$

where F(x), a, $S_{avg}$, $S_i$, and $S_o$ represent the saturation enhancement function, the saturation enhancement function determining variable, the average saturation of the input image, saturation of the input image, and saturation of the output image, respectively.

27. The apparatus of claim 24, wherein the saturation enhancement function determining variable calculator determines the saturation enhancement function determining variable and the saturation enhancement function using the following equations:

$$a = A(S_{avg})$$
$$S_o = F(S_i) = S_i + a \times \Delta$$
$$\Delta = \frac{K \times S_i^2}{(K-1) + S_i^2} - S_i$$

where F(x), a, $S_{avg}$, $S_i$, $S_o$, and K represent the saturation enhancement function, the saturation enhancement function determining variable, the average saturation of the input image, saturation of the input image, saturation of the output image, and an arbitrary constant, respectively.

28. The apparatus of claim 24, wherein a maximum of the saturation enhancement function determining variable is determined based upon the visual perception characteristics of a predetermined color difference formula in a CIEL*a*b* color space.

29. The apparatus of claim 28, wherein the color difference formula is defined by the following equation:

$$\Delta E_{LH} = \sqrt{\Delta L^2 + \Delta H^2}$$

where $\Delta H$ and $\Delta L$ represent variations in hue and lightness, respectively.

30. The apparatus of claim 19, wherein the saturation enhancement function determining variable calculator determines the saturation enhancement function based upon the preferred saturation enhancement value input from a user.

31. The apparatus of claim 19, wherein the saturation enhancement function determining variable calculator determines the saturation enhancement function determining variable based upon the preferred saturation enhancement value input from a user and the saturation enhancement function based upon the saturation enhancement function determining variable.

32. The apparatus of claim 31, wherein the saturation enhancement function determining variable calculator determines the saturation enhancement function determining variable using the following equation:

$$a = A(a_{user})$$

where a and $a_{user}$ represent the saturation enhancement function determining variable and the preferred saturation enhancement value, respectively.

33. The apparatus of claim 31, wherein the saturation enhancement function determining variable calculator determines the saturation enhancement function determining variable and the saturation enhancement function using the following equations:

$$a = A(a_{user})$$

$$S_o = F(S_i) = \frac{(a+1)S_i^2}{a + S_i^2}$$

where F(x), a, $a_{user}$, $S_i$, and $S_o$ represent the saturation enhancement function, the saturation enhancement function determining variable, the preferred saturation enhancement value, saturation of the input image, and saturation of the output image, respectively.

34. The apparatus of claim 31, wherein the saturation enhancement function determining variable calculator determines the saturation enhancement function determining variable and the saturation enhancement function using the following equations:

$$a = A(a_{user})$$

$$S_o = F(S_i) = S_i + a \times \Delta$$

$$\Delta = \frac{K \times S_i^2}{(K-1) + S_i^2} - S_i$$

where F(x), a, $a_{user}$, $S_i$, $S_o$, and K represent the saturation enhancement function, the saturation enhancement function determining variable, the preferred saturation enhancement value, saturation of the input image, saturation of the output image, and an arbitrary constant, respectively.

35. The apparatus of claim 31, wherein a maximum of the saturation enhancement function determining variable is determined based upon the visual perception characteristics of a predetermined color difference formula in a CIEL*a*b* color space.

36. The apparatus of claim 35, wherein the color difference formula is defined by the following equation:

$$\Delta E_{LH} = \sqrt{\Delta L^2 + \Delta H^2}$$

where, $\Delta H$ and $\Delta L$ represent variations in hue and lightness, respectively.

37. The apparatus of claim 20, wherein the second color space is an HSV color space or a YCbCr color space.

38. A computer-readable recording medium comprising a program that executes the method of claim 1 in a computer or digital display device.

* * * * *